Jan. 12, 1971   G. L. JOHNSON ET AL   3,553,819
METHOD OF USING FINGER-HELD TOOLS
Original Filed May 24, 1967   2 Sheets-Sheet 1
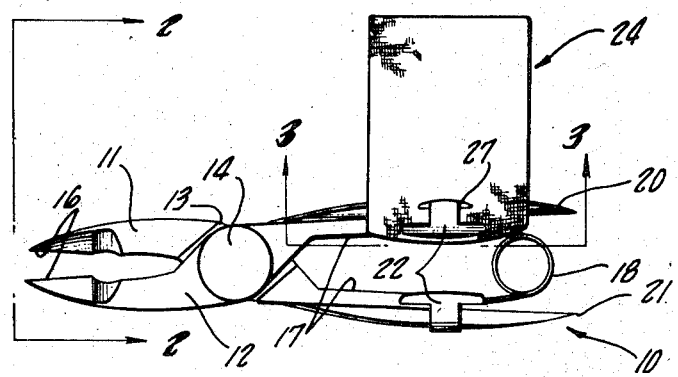
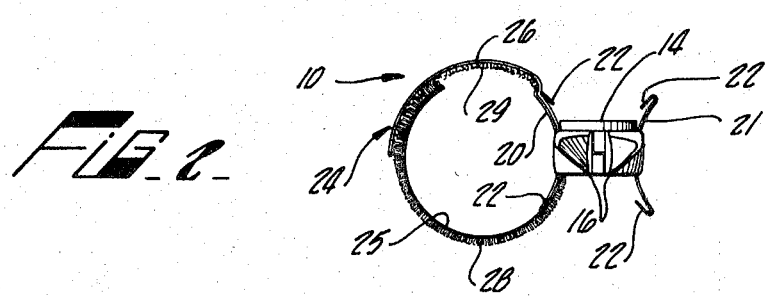
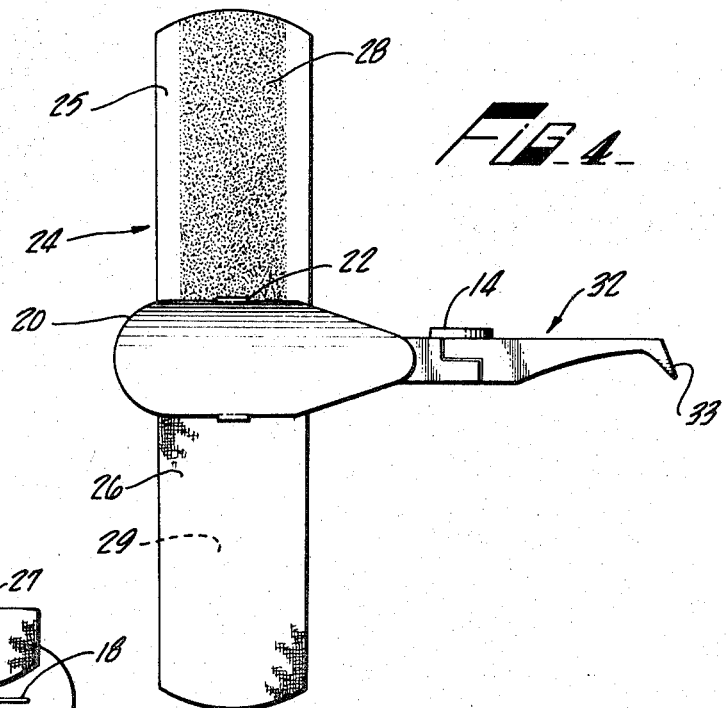
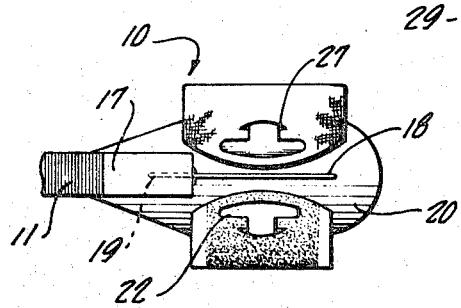
INVENTORS.
GARY L. JOHNSON
ROBERT M. SHRYOCK

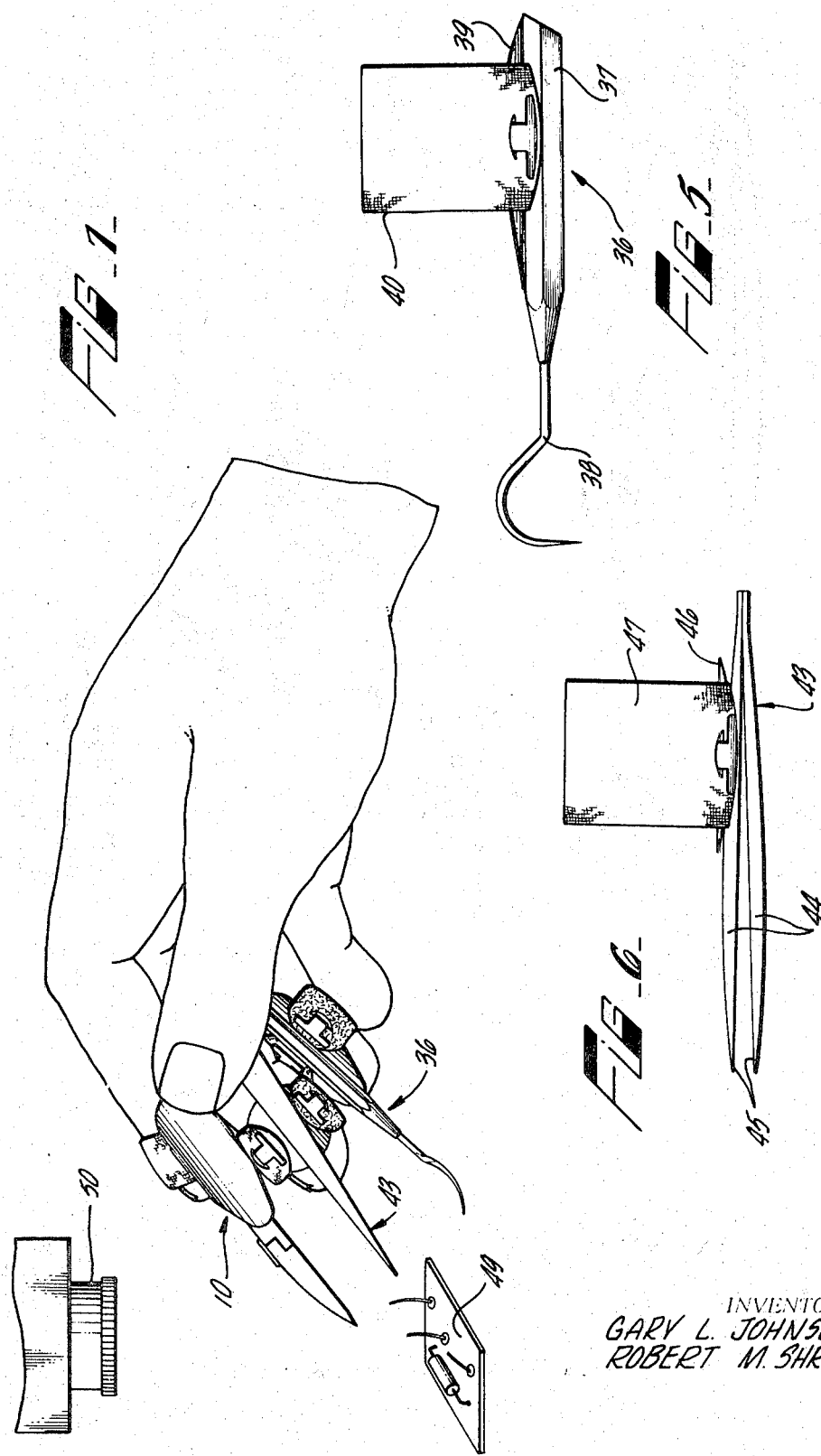

United States Patent Office 3,553,819
Patented Jan. 12, 1971

3,553,819
METHOD OF USING FINGER-HELD TOOLS
Gary L. Johnson and Robert M. Shryock, Monrovia, Calif., assignors to E.T.M. Corporation, Monrovia, Calif., a corporation of California
Original application May 24, 1967, Ser. No. 640,908, now Patent No. 3,399,456, dated Sept. 3, 1968. Divided and this application May 13, 1968, Ser. No. 728,640
Int. Cl. B23g 17/00; H05k 13/04
U.S. Cl. 29—407
2 Claims

ABSTRACT OF THE DISCLOSURE

A method for performing multiple operations on a part by serial manipulation of several finger-mounted tools. The tools are alternately brought against the thumb to perform an associated operation such as cutting, bending, postioning or gripping. In assembly of minature parts under a microscope, efficiency is improved by this technique because the operator can view the part continuously without looking away from the microscope to select and replace the several tools in use.

CROSS REFERENCE TO RELATED APPLICATION

This application is a division of copending application Ser. No. 640,908, filed May 24, 1967, and titled, "Finger-Held Tools," now U.S. Pat. 3,399,456, granted Sept. 3, 1968.

BACKGROUND OF THE INVENTION

Small precision tools such as cutters, tweezers and positioners are widely used in the manufacture and assembly of a variety of mechanical and electrical parts and devices. For example, miniturized and fragile electronic components such as transistors and microcircuits must be handled and assembled with small, sensitive tools. Such devices are typically viewed through a binocular microscope during assembly because they are too small to be accurately viewed by the naked eye.

Conventional tools used in assembly of miniature components present several problems. first, these tools often fail to provide the user with a sensitive "feel" for how much force or pressure is being exerted on the component being manipulated. Conventional side-cutting pliers, for example, have handles intended to be grasped by the full hand of the user, and it is difficult to gage the amount of pressure exerted by the cutting edges or tips of the pliers when the handles are gripped.

A second problem with conventional tools is the relatively inefficient way in which the tools are handled when the user is working with a microscope. The tools needed for a particular operation are usually placed on a bench alongside the microscope, and are picked up one at a time to perform specific operations. Each time a tool is selected, the user's eyes must be shifted from the microscope to the bench to find the desired tool, and then shifted back to the microscope to perform the operation. This procedure is slow because productive assembly work is interrupted each time another tool is required, and it also produces eye fatigue because the eyes must be refocused each time they swing away from or return to the microscope.

The tools of this invention overcome these problems, and are adapted to be mounted directly on the user's fingers. The finger rests against a dished plate secured to the tool, and an adjustable-length strap fastened to the plate extends around the finger to secure the tool thereto. More than one tool can be mounted on the user's hand, and, for example, a cutter can be positioned on the index finger, a tweezer on the middle finger, and a probe or positioner on the ring finger. The user's thumb is positioned against the tool needed for the next operation, and a very sensitive and subtle feeling for tool pressures is provided by this arrangement.

A significant advantage of the concept of mounting several tools on the user's hand is that the tool needed for the next operation is brought into operating position without any need for the user's eyes to be removed from the microscope. The eyes are maintained in constant focus on the magnified image of the workpiece, and the desired tool is selected simply by swinging the thumb against the finger-mounted tool and moving the tool into operating position. Production efficiency is substantially increased, and eye fatigue of the user is greatly reduced by this technique.

SUMMARY OF THE INVENTION

The invention contemplates an improvement in a hand tool having an elongated handle, the improvement comprising a concavely dished plate secured to the handle, and an adjustable-length strap secured to and extending laterally from the plate, the plate and strap defining a continuous finger loop for mounting the tool on a finger. Preferably, the strap comprises a pair of elongated strips, the strips being secured to a pair of cleat-shaped hooks on the plate. A body of thistle-cloth hook material is secured to one strip, and a body of thistle-cloth pile material is secured to the other strip, the hook material and pile material are engageable to form a fastening means for securing the strips together. In tools such as side cutters which have a pair of handles or arms, each of the arms carries a concavely dished plate, and the strap is adapted for mounting on either of the plates so the tool can be mounted on either the right or left hand of the user.

In method terms, the invention contemplates a procedure for performing multiple operations on a part. At least two finger-mounted tools are secured to separate fingers on the hand of an operator, the several tools being adapted to perform different operations on the part. One of the tools is then gripped between the thumb and respective finger of the hand to enable performance of a first operation on the part. Another of the tools is then gripped between the thumb and respective finger of the hand to enable performance of a second operation on the part, whereby multiple operations are performed without picking up and laying down separate tools. The method is especially advantageous where the operations are carried out with the aid of optical magnification, as the operator can view the part through a microscope continuously during performance of the several operations without shifting and refocusing the eyes to locate separate tools.

BRIEF DESCRIPTION OF THE DRAWINGS

The invention will be described in detail with reference to the attached drawings, in which:

FIG. 1 is an elevation of a side-cutting plier incorporating the inventive improvement;

FIG. 2 is an end view of the side-cutting plier taken on line 2—2 of FIG. 1;

FIG. 3 is a view on line 3—3 of FIG. 1 showing the convex undersurface of a dished plate on the side-cutting plier;

FIG. 4 is a view of another form of cutter, showing an unfastened strap in extended form;

FIG. 5 is a view of a positioner or probe incorporating the invention;

FIG. 6 is a view of a tweezer incorporating the invention; and

FIG. 7 is a perspective view of several tools incor-

DESCRIPTION OF THE PREFERRED EMBODIMENTS

A cutter 10 incorporating the improvement of this invention is shown in FIGS. 1–3, and includes a pair of handles or arms 11 and 12. Each arm includes a recess 13, permitting the arms to be fitted together to form the usual plier hinge, and the arms are pivotally secured together by a rivet 14 or other fastener. Each arm has a first end defining a cutting edge 16, and a second end defining a handle portion 17, the cutting edge and handle portion being on opposite sides of a hinge axis defined by the axis of rivet 14. A conventional separator spring 18 has ends disposed in grooves 19 formed in the outer faces of the handle portions, and the spring urges the tool into an open position with the cutting edges separated from each other about one-eighth inch as shown in FIG. 1. The spring also tends to restrict and limit the separation of the arms from each other so the tool is always positioned for immediate use and the arms are constrained from pivoting into a clumsy position.

A pair of dished plates 20 and 21 are soldered or welded to the outer faces of the respective handle portions of arms 11 and 12, the plates covering grooves 19 and extending laterally away from the elongated arms. As best seen in FIG. 2, each plate is concavely curved to fit comfortably against the user's finger. The plate has a much larger surface area than the side of the associated arm, and this enlarged surface contact with the finger provides a secure, comfortable mount with substantially increased "feel" or sensitivity for the user.

A pair of hooks or cleats 22 are integrally formed on opposite side edges of each dished plate, and the cleats are bent rearwardly toward each other to lie approximately parallel to the back surfaces of the plates. An adjustable-length strap 24 is formed from a pair of cloth or plastic flexible strips 25 and 26, and each strip has at one end a slit 27 therethrough. Cleats 22 are passed through slits 27 to fasten the strips to dished plate 20 as shown in the drawings. The cleat style of hook is preferred as it provides secure anchoring for the strips, but the strips are easily installed or removed therefrom.

Strip 25 carries a body of thistle-cloth hook material 28, and strip 26 carries a body of thistle-cloth pile material 29, the bodies being oriented on the strips to face each other when the strips are formed in a closed loop as shown in FIG. 2. The hook material includes many small barblike hooks, and the pile material includes many small loops. When these materials are pressed together, the hooks engage the loops to secure the two bodies of material together into a thistle-cloth fastener. These fasteners, sold under the trademark "Velcro," are easily separated for adjustment of loop length by moving them apart with a peeling motion. The thistle-cloth material is flexible and cushioned to conform comfortably to the contour of a finger.

In use, cutter 10 is mounted on the user's finger as shown in FIG. 7 by slipping the loop formed by strap 24 and plate 20 over the fingertip. The strap is readily adjusted for a snug fit on the finger by separating and re-engaging the bodies of hook and pile material which secure the ends of strips 25 and 26 together. When the proper adjustment has been made, the strap is easily slipped on and off the user's finger, but at the same time forms a secure mount for the tool because the strap and dished plate form a continuous, unbroken loop fitted closely around and conforming to the finger. The thistle-cloth strap is greatly superior to rubber rings or straps formed of elastic or spring material because it is easily adjusted for a snug fit, but does not elastically grip the finger to interfere with normal blood circulation.

A tool such as cutter 10 is inherently "one-sided" as cutting edges 16 are not centered in the thickness of the tool but are instead formed in the bottom face of arms 11 and 12 as best seen in FIG. 2. This "side cutter" configuration is desirable because it permits cutting edges 16 to be positioned immediately against the surface of a circuit board, for example, to cut a connecting wire flush with the surface of the board. If the user desired to mount cutter 10 on the index finger or another finger of the left hand, the cutter will be upside down if plate 21 is positioned to face the left thumb. This problem is quickly solved by removing strap 24 from cleats 22 on plate 20, and reinstalling the strap on the cleats on plate 21. Plate 21 is then positioned against and secured by the strap to say the index finger of the left hand, and plate 20 becomes the rest or gripping surface for the left thumb. The tool is therefore readily reversible, and completely flexible for use by right-handed or left-handed operators.

Another form of a cutter 32 is shown in FIG. 4, and is generally similar to cutter 10 with the exception that it incorporates steeply angled cutting tips 33. This angulation of the cutting tips to the axes of the tool arms permits the tool to be held at a high angle with respect to the workpiece. This tool orientation is important in many applications where only a small access space is available for the tool. Cutter 32 incorporates a strap 24 just as already described with reference to cutter 10, and the two strips forming the strap are shown in extended disengaged form in FIG. 4.

The concept of the invention is also useful on non-pivoted tools such as a probe or positioner 36 shown in FIG. 5. The positioner includes an elongated handle 37, and a curved and pointed tip 38 extending from one end of the handle. A concavely dished plate 39 is welded or soldered to handle 37, and a strap 40 extends from the plate to form a continuous loop with the plate. Plate 39 and strap 40 are identical to corresponding plate 20 and strap 24 on tool 10 as already described. Only one plate is necessary on the positioner as it lacks the inherent one-sidedness of a side cutter.

The invention is also useful with a precision tweezer 43 as shown in FIG. 6. Tweezer 43 includes a pair of arms 44 which are secured together at one end. The ends of the arms opposite the joined ends are narrowed to form gripping surfaces 45. A concavely dished plate 46 is soldered or welded to one of the arms, and a strap 47 extends from the plate, the plate and strap being identical to plate 20 and strap 24 as already described. As best seen in FIG. 7, the longitudinal axis of the tweezer is preferably positioned at a slight angle to the longitudinal axis of the plate whereby the tweezer is positioned at a slight angle to the length of the user's finger. This angulated mounting is the most natural tool position for most users, and a cant or skew angle of about 10 degrees for straight tweezers (as shown in FIG. 6) or about 18 degrees for curved-tip tweezers (not shown) has been found to be satisfactory.

An important feature of the invention is that several different tools can be mounted on the fingers of the user as suggested in FIG. 7. A selected tool is brought into operating position on a workpiece such as a circuit board 49 simply by moving the thumb and finger so the thumb is positioned against the tool. This intimate contact of the tool with the fingertips gives a very sensitive control over tool position, and also provides a high degree of "feel" whereby the operator is able to judge the amount of force or pressure developed at the cutting edges or gripping surfaces of the tool in use. The tools are essentially extensions of the user's fingers, and very precise manipulation of the workpiece is made possible. When assembly work is conducted under a magnifying device such as a microscope 50 partially shown in FIG. 7, the different tools are easily swung into position without the operator's eyes moving from the microscope eyepiece. The resulting reduction in eye fatigue and increase in assembly efficiency are considered to be significant features of the invention.

As shown in FIG. 7, the tools of this invention are free of any structure extending proximally or toward the palm beyond a proximal interphalangeal joint (on all fingers except the thumb, this is the second joint encountered when counting from the finger tip toward the palm) of the finger on which the tool is mounted. The finger can thus be flexed freely to enable serial use of several tools mounted on different fingers of the hand. The portion of the tool contacted by the thumb is a hard non-resilient surface to avoid any loss in sensitivity to forces exerted at the working tips of the tools.

There has been described a unique improvement in hand tools which makes possible the mounting of the tool securely and comfortably on the user's fingers. While the invention has been described in terms of specific, presently preferred forms, various modifications of these designs will suggest themselves to those skilled in the art. All such variations and modifications are intended to be encompassed within the scope of the appended claims which define the invention.

We claim:

1. A method of performing multiple operations on a part, comprising the steps of:
   (a) securing at least two finger-mounted tools to separate fingers on a hand of an operator, the several tools being adapted to perform different operations on the part;
   (b) gripping one of the tools between the thumb and respective finger of the hand to enable performance of a first operation on the part; and
   (c) gripping another of the tools between the thumb and respective finger of the hand to enable performance of a second operation on the part, whereby multiple operations are performed without picking up and laying down separate tools.

2. The method defined in claim 1 in which the operator views the part through a microscope continuously during serial performance of the several operations.

References Cited

UNITED STATES PATENTS

| | | | |
|---|---|---|---|
| 3,051,026 | 8/1962 | Da Costa | 228—6 |
| 3,102,331 | 9/1963 | Da Costa | 29—203 |
| 3,331,119 | 7/1967 | Gingell et al. | 29—407 |

THOMAS H. EAGER, Primary Examiner

U.S. Cl. X.R.

29—203; 30—232